June 2, 1942.  J. V. RERUCHA  2,285,127
GAS HEATED TOASTER
Filed May 22, 1939  2 Sheets-Sheet 1
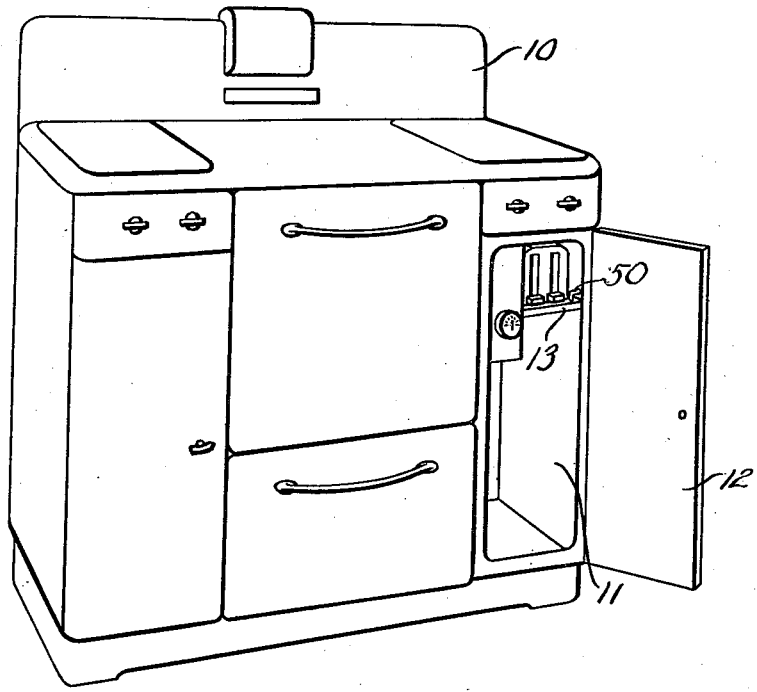
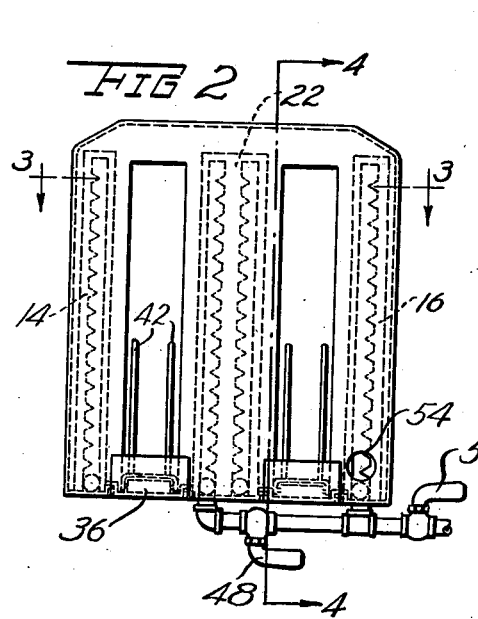
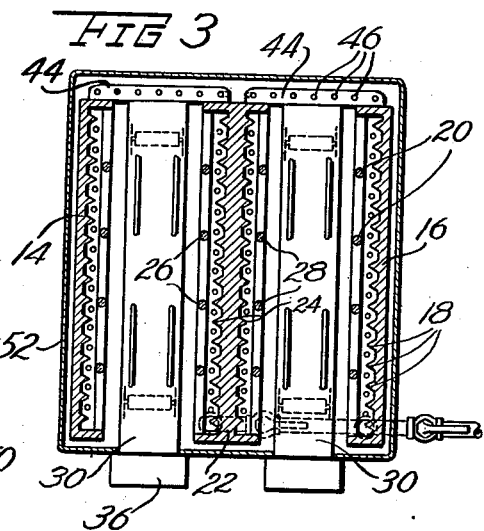
Inventor
John V. Rerucha
Owen & Owen
Attorneys June 2, 1942.  J. V. RERUCHA  2,285,127
GAS HEATED TOASTER
Filed May 22, 1939  2 Sheets-Sheet 2
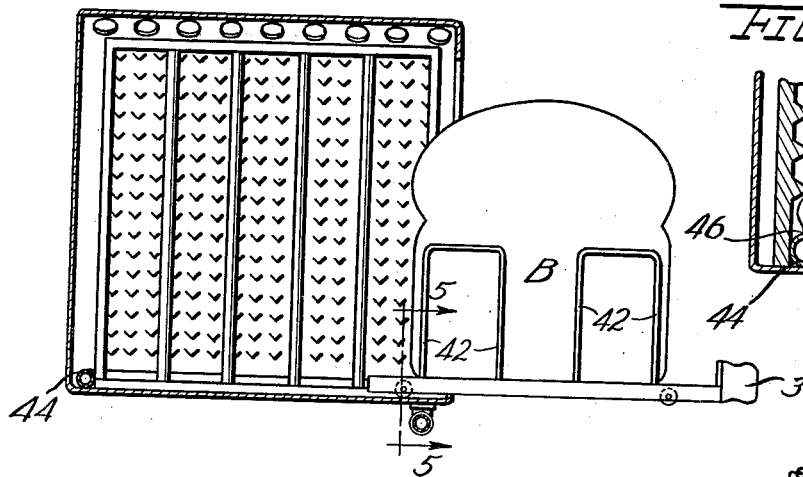
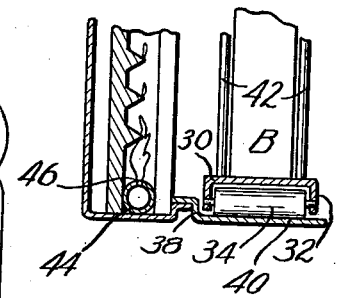
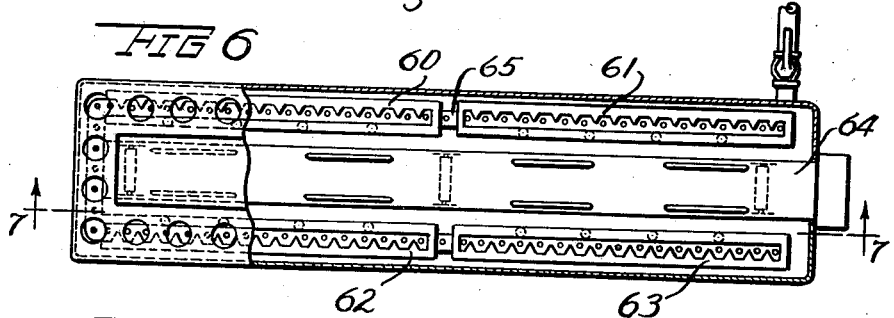
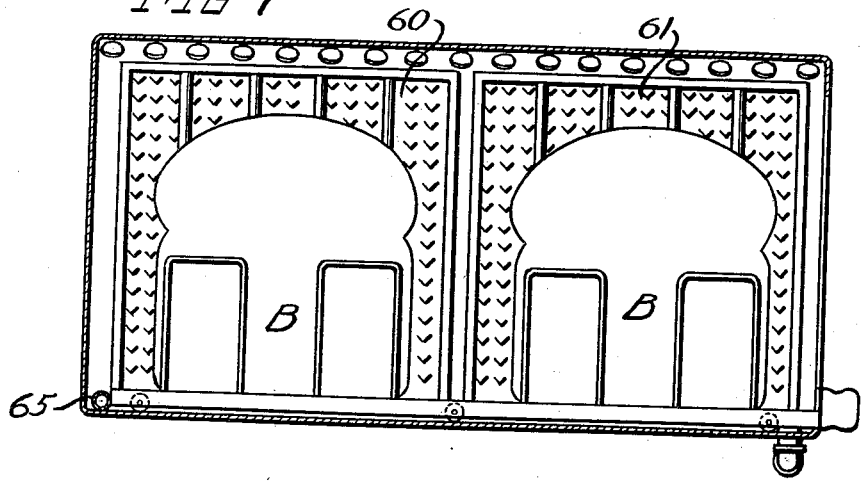
Inventor
John V. Rerucha
By Owen & Owen
Attorneys Patented June 2, 1942

2,285,127

UNITED STATES PATENT OFFICE 2,285,127

GAS HEATED TOASTER

John V. Rerucha, Toledo, Ohio, assignor of one-half to James T. McMahon, Toledo, Ohio Application May 22, 1939, Serial No. 274,918

2 Claims. (Cl. 126—41)

This invention relates to gas heated toasting appliances particularly adapted for use with gas ranges.

The primary object of the invention is to provide a small, efficient gas heated toaster applicable to a front opening compartment of a gas range. A toaster in accordance with the present invention uses an extremely small quantity of gas and toasts bread in a very short time.

Another object of the invention is to provide a gas heated toaster employing radiant elements to pick up and distribute heat evenly over the entire effective area of the toaster.

Other objects and advantages of the invention will become apparent as the description proceeds, reference being had to the drawings in which:

Figure 1 is a diagrammatic perspective view of a gas range embodying the present invention;

Fig. 2 is a front view of one form of toaster embodying the invention;

Fig. 3 is a section on line 3—3 of Fig. 2;

Fig. 4 is a section on line 4—4 of Fig. 2;

Fig. 5 is an enlarged fragmentary sectional view on line 5—5 of Fig. 4;

Fig. 6 is a top plan view with parts broken away of a modified form of toaster; and Fig. 7 is a section on line 7—7 of Fig. 6.

Referring to the drawings and particularly to Figs. 1 to 4, the invention is shown incorporated in a gas range 10 having a front opening compartment 11 closed by a door 12 and ordinarily used for storage purposes. The upper portion of the compartment may be separated from the lower by a shelf 13, and it is on this shelf that the toaster is installed. The toaster therefore may be completely enclosed by the door 12 and presents a neat, permanent installation as contrasted to the ordinary "extra" appliances which are independent units.

The toaster itself may be constructed in several different ways, two preferred forms being shown in the drawings. The forms shown each provide for the simultaneous toasting of two slices of bread, one with the slices disposed in side by side relation and the other (Figs. 6 and 7) with the slices disposed in tandem.

In the forms shown in Figs. 2 to 4, the toaster includes outer facing ceramic radiant elements 14 and 16 each having a solid rear wall from which radiant points 18 project. The front of each radiant element is made up of a suitable grille work which may consist of simple vertical bars 20. The front is spaced from the rear wall and the gas flame enters this space as hereinafter described.

The center radiant is made up of a solid center wall 22 having radiant points 24 projecting from each side and two front grilles 26 and 28 spaced therefrom in a manner similar to the single radiants above described. A construction of this character permits the toaster to be made up as a "battery" to accommodate as many slices of bread as may be desired at the same time with a maximum heat economy because of the minimum of exposed area on the inactive sides of the radiants.

The two facing side radiants and the center radiant therefore define two heating spaces into which bread is inserted. Preferably the bread is carried on drawers including a base 30 having downturned side walls 32 between which antifriction rollers 34 may be journaled so that the drawers work easily. Suitable drawer pulls 36 are attached to the end of each drawer, and the drawers themselves may be guided in any suitable manner as by the side walls 38 of a groove formed in a bottom sheet 40 forming part of the casing of the toaster.

Racks 42 of relatively thin cross section extend upwardly from the drawer base at each side thereof to hold bread slices in an approximately vertical position, the bread slices being designated B in the drawings.

The gas burners preferably include simple pipes or tubes 44 of U-shape underlying each pair of radiants or on each side of the bread carrying drawers. The pipes are ported as at 46 so that flame issuing from the pipes enters the space immediately in front of the rear wall of each radiant and into contact with the radiant points 18. The radiant points pick up heat from the flame and become incandescent and not only serve to complete combustion of the gas but radiate their collected heat outwardly to the bread. It has been found that in a unit burning less than six cubic feet of gas per hour the radiants attain a temperature sufficient to toast bread satisfactorily in from 10 to 15 seconds.

In the "battery" form of toaster shown in Figs. 2 to 4, the gas in the two U-shaped pipes may be controlled independently by series valves 48 and 50 in which case a single slice of bread may be toasted, or if desired, the control may be by a single valve such as valve 50 in which case both units are lighted simultaneously.

A casing or shell 52 encloses and supports the radiant elements and burners and lighting openings 54 are provided in the front wall. Obviously, match lighting is the simplest form although any known automatic lighter may be applied to the unit.

In the form shown in Figs. 6 and 7, four single faced radiant elements 60, 61, 62 and 63 are used, disposed in aligned facing pairs on each side of a single bread carrying drawer 64. In this form only a single U-shaped gas pipe 65 is employed, but otherwise the construction is similar in detail to the form previously described.

While the invention has been described in a specific embodiment it should be appreciated that various mechanical changes will suggest themselves to those skilled in the art and that such changes may be made without departing from the invention as defined in the appended claims.

What I claim as new and desire to secure by United States Letters Patent, is:

1. In combination with a gas range having an auxiliary storage compartment opening in the front, a door closing said storage compartment and a gas supply, a gas heated toaster in said compartment, and having a bread carrying drawer, said drawer when extended projecting out of said compartment beyond the plane of said door but operable independently thereof, and when in its inner position lying entirely within the confines of said compartment and concealed by said door when closed.

2. In combination with a gas range having a storage compartment, a door closing said compartment, and a gas supply, a unit formed for insertion in the compartment, which includes a casing having connected side, back, and front walls, a pair of spaced confronting radiant elements in the casing, a bread drawer slidably mounted in the space between the elements, said elements being located in close juxtaposition so as to lie correspondingly close to the respective sides of a slice of bread, the front wall of the casing having an opening vertically alined with the space between the elements so as to provide for movement of the drawer and of the slice of bread carried thereby, into and out of the casing, said casing and its opening being formed so as to lie rearwardly of the compartment door whereby when the latter is closed the heat is confined within the casing, gas supply pipes within the casing disposed in close proximity to each of the elements adjacent the bottoms thereof, and means to connect the pipes to the gas supply.

JOHN V. RERUCHA.